(No Model.) 3 Sheets—Sheet 1.
M. WOSCHYLLO.
MACHINE FOR MAKING NETS.
No. 560,560. Patented May 19, 1896.
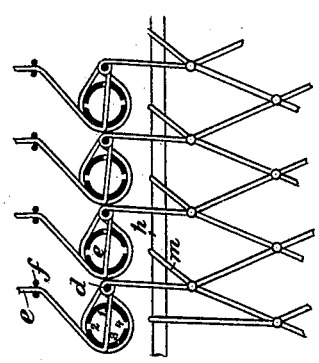
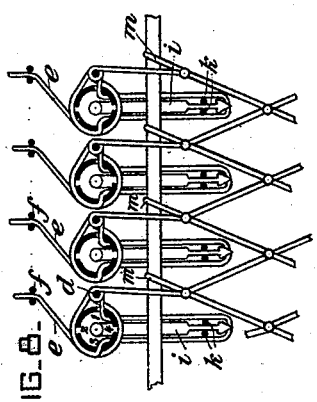
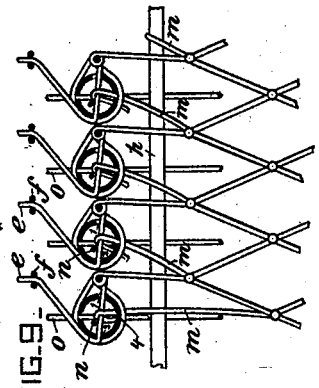
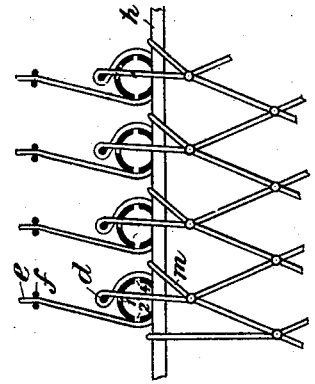
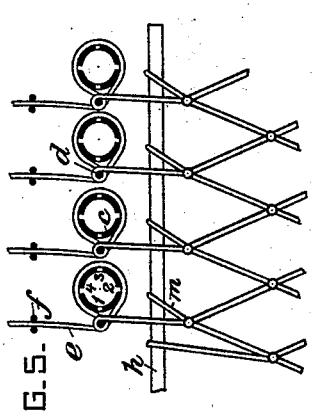
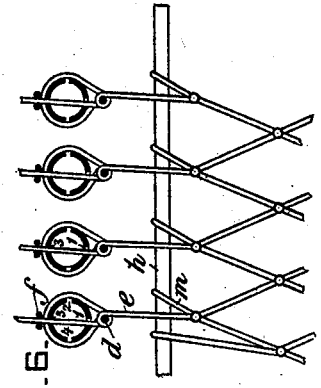
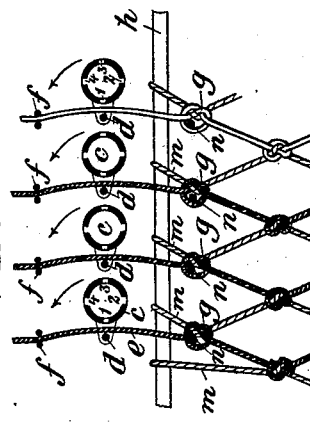
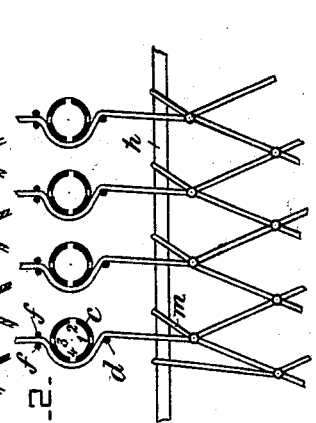
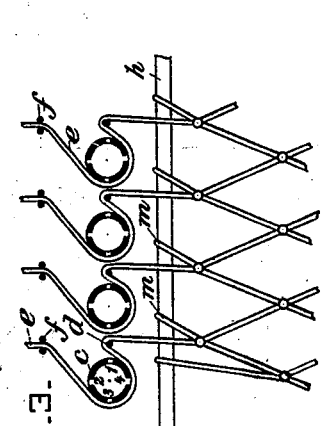
WITNESSES:
E. J. Griswold
L. Wenke
INVENTOR
Michail Woschyllo
BY
Howson and Howson
his ATTORNEYS (No Model.) 3 Sheets—Sheet 2.
M. WOSCHYLLO.
MACHINE FOR MAKING NETS.
No. 560,560. Patented May 19, 1896.
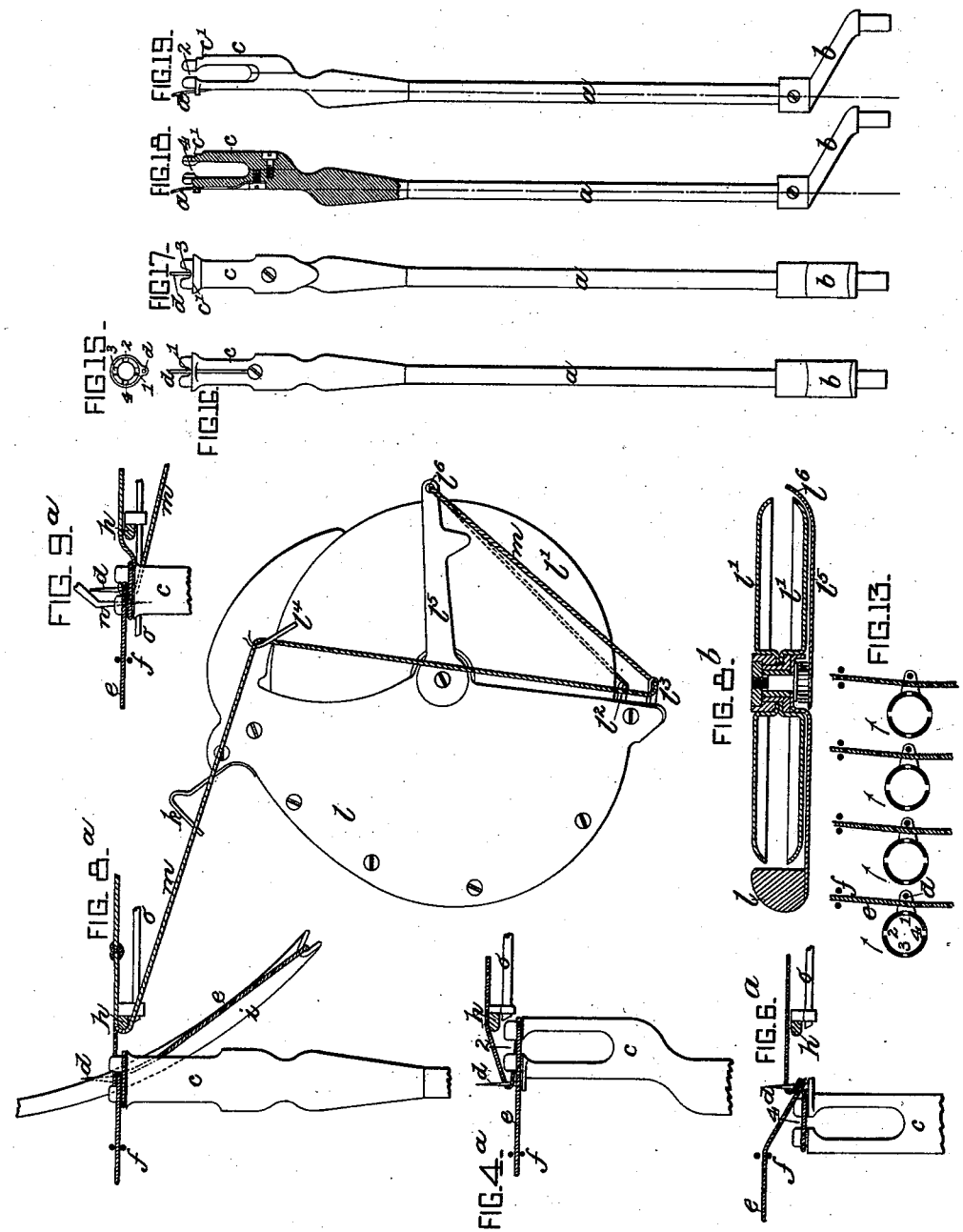
WITNESSES:
E. J. Griswold
L. Wenke
INVENTOR
Michael Woschyllo
BY
Howson and Howson
his ATTORNEYS.

(No Model.) 3 Sheets—Sheet 3.
M. WOSCHYLLO.
MACHINE FOR MAKING NETS.
No. 560,560. Patented May 19, 1896.
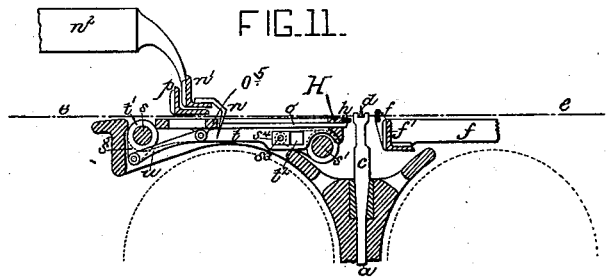
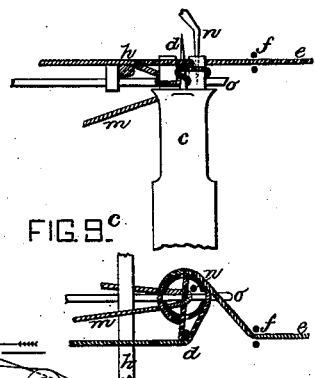
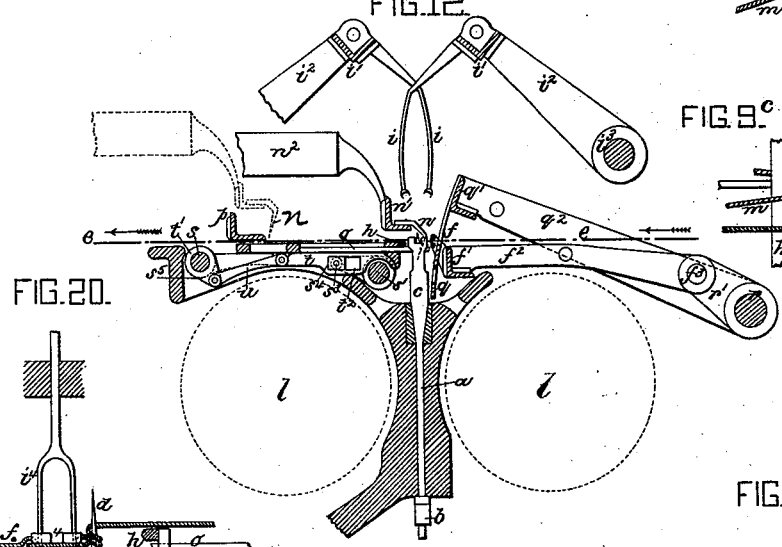
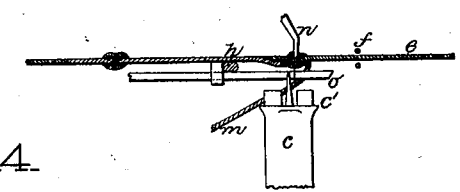
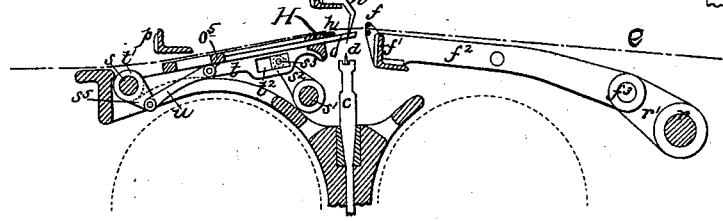
WITNESSES:
E. J. Griswold
L. Wenke
INVENTOR
Michail Woschyllo
BY
Howson and Howson
his ATTORNEYS.

UNITED STATES PATENT OFFICE.

MICHAIL WOSCHYLLO, OF ST. PETERSBURG, RUSSIA, ASSIGNOR TO NINA SAPOZHNIKOVA, OF SAME PLACE.

MACHINE FOR MAKING NETS.

SPECIFICATION forming part of Letters Patent No. 560,560, dated May 19, 1896.

Application filed October 3, 1895. Serial No. 564,526. (No model.) Patented in Germany November 1, 1892, No. 74,596, and in France October 21, 1893, No. 233,565.

*To all whom it may concern:*

Be it known that I, MICHAIL WOSCHYLLO, a subject of the Emperor of Russia, and a resident of St. Petersburg, Russia, have invented Improvements in Machines for Making Nets, (patented in Germany November 1, 1892, No. 74,596, and in France October 21, 1893, No. 233,565,) of which the following is a specification.

My invention relates to machines for making nets, by which a number of knots to form the meshes are tied simultaneously.

In the accompanying drawings, Figures 1 to 9 are diagrammatic plan or face views representing in succession the different steps in the formation of the knots. Figs. $4^a$, $6^a$, $8^a$, and $9^a$ are views at right angles to Figs. 4, 6, 8, and 9, respectively, Fig. $8^a$ also showing one of the shuttles carrying what for convenience I will term the "weft-thread." Fig. $8^b$ is a sectional view of a shuttle and bobbin. Fig. $9^b$ is a view similar to Fig. $9^a$, looking at the opposite side of the loop-former. Fig. $9^c$ is a diagrammatic plan view of Fig. $9^b$. Figs. 10 and 11 are views showing, respectively, the two steps in the operation succeeding the one shown in Fig. 9. Fig. 12 is a cross-section of the part of a machine for forming the knots. Fig. 13 is a diagram hereinafter explained. Fig. 14 is a view similar to Fig. 12, but showing some of the parts of the mechanism in different positions and omitting others. Fig. 15 is an end view, and Figs. 16, 17, 18, and 19 side views, of the loop-former, Fig. 18 being partly in section. Fig. 20 is a view of a modification.

Referring to Fig. 12, the thread, which for convenience I will call the "warp-thread," (represented by the dotted line $e$,) passes in the direction of the arrow through guides $f$ to a loop-former $c$, where the knot is tied, and thence out at the other side of the machine. The weft-thread $m$ is wound on a bobbin $l'$, carried in the shuttle $l$. (See Figs. $8^a$ and $8^b$.) It is threaded through the eye $l^2$, then through the eye $l^6$ of the spring-controlled tension-lever $l^5$, through the eye $l^3$, and temporarily over the horn $l^4$, thence to and over a transverse bar $h$. The shuttles and bobbins may be placed either all on one side of the loop-formers, as represented in Fig. $8^a$, or, for the purpose of saving space, on both sides, as shown in Figs. 11, 12, and 14. One shuttle with its bobbin is placed between two warp-threads $e$, the weft-thread $m$ being alternately tied first to one of its adjacent warp-threads and then to the other.

The loop-formers (represented in Figs. 15 to 19) are constructed with spindles $a$, rotating in bearings in the frame, and may be provided at their lower ends with cranks $b$, whereby rotary motion may be imparted to the loop-formers by any suitable means.

Each spindle $a$ carries at its upper end a cylinder $c$, set eccentrically to the axis of the spindle, and a pin $d$, which is concentric with the spindle $a$, a space being left between the pin $d$ and the cylinder $c$ for the passage of a warp-thread. This pin $d$ projects above the cylinder $c$. The extreme end of the cylinder is provided with four radial recesses or notches 1 2 3 4, Figs. 15 to 19, leaving intermediate projections or pins, and is further slotted some distance down in line with the notches 2 4 for the passage of the loopers $i$. The cylinder $c$ is also provided with a projecting edge or shoulder $c'$ to support the warp-threads, as hereinafter explained.

The loopers $i$, which are shown in the raised position in Fig. 12 and in the lowered position in Fig. $8^a$, are carried by angle-bars $i'$, which are secured to the arms $i^2$ of shafts $i^3$. If one row only of shuttles be used, but one row of loopers $i$ will be necessary. Where two rows of shuttles are used, Fig. 12, there must be two rows of loopers, one row to move toward each row of shuttles.

The warp-thread guides $ff$ are carried by an angle-bar $f'$, secured to arms $f^2$, which in turn are jointed to arms $r'$ of shaft $r$ by pins $f^3$. These guides are moved up and down by any suitable mechanism in the manner hereinafter described.

Arms $t$, oscillating on a center $s$, carry a bar H, having a projecting edge $h$, on which are supported the warp and weft threads between the loop-formers and the row of knots last formed. This bar H $h$ is adapted to be moved up and down, Figs. 12 and 14, by means of a shaft $s'$, carrying an arm $s^2$, which has a pin $s^3$, engaging with a slide $s^4$ in a slot $t^2$ of one of the arms $t$. Rods $o$, guided in slots in the bar H, are carried by a frame $o^5$, guided on the arms $t$. These rods $o$ have a forward-and-backward movement imparted to them by any suitable means (such as arms $s^5$ of the shaft $s$ and connecting-links $u$) for the purpose of pushing off the knots when formed from the loop-formers, as hereinafter explained.

Hooks $n$ are carried by an angle-bar $n'$ on arms $n^2$. Their function and operation are explained farther on.

I will now explain how the knots are formed. Supposing the loop-formers are in the position shown in Fig. 1, each cylinder $c$ at the right-hand side of a warp-thread $e$ and the corresponding pin $d$ on the left-hand side thereof, these loop-formers being situated about half-way between the warp-thread guides $f$ and the row of knots $g$ last formed. As the spindles $a$ are rotated the cylinders $c$ revolve around the pins $d$ in the direction shown by the arrows and the warp-threads $e$ are drawn from their bobbins around the cylinders $c$ and pins $d$, Figs. 2 and 3, and a bight is formed in each warp-thread by means of the pin $d$. As the cylinder continues its rotation from the position shown in Fig. 3 the bar $h$ moves upward and lifts the threads on the net side high enough to allow the loop-former to pass fully underneath the threads and into the position shown in Figs. 4 and $4^a$. After the cylinders have completed their first revolution and are proceeding to the position shown in Fig. 6 the guides $f$ are raised and the warp-threads $e$, between the pins $d$ and guides $f$, are placed diametrically across the cylinder, Fig. 6 and $6^a$, and above the loop formed around the cylinder. The bar $h$ has in the meantime descended from the position shown in Fig. $4^a$ to that shown in Fig. $6^a$. The guides $f$ being lowered, the warp-threads enter the recesses 1 and 3 of the cylinders, and as the latter continue their rotation into the positions shown in Fig. 7 the loopers $i$ descend, each through the slotted part of the corresponding cylinder, as shown in Figs. 8 and $8^a$, the forked end of the looper carrying the portion of the warp-thread which lies diametrically across the upper end of the cylinder out of the cylinder toward the shuttle $l$. The loop of warp-thread is thus thrust out directly into the path of the hook $k$ on the shuttle, which hook enters the loop in the manner usual in sewing-machines, carries the loop around the shuttle, and then releases it. In the meantime the loopers $i$ have been raised again into the positions shown in Fig. 12. The weft-threads $m$ have thus been passed through the loops of warp, tension-weights or their equivalents have drawn the threads taut, and the threads are in the positions shown in Figs. 9, $9^a$, $9^b$, and $9^c$. The loop-formers now remain stationary until the knots have been pushed off from the cylinders $c$ and pins $d$ and drawn forward.

It may be mentioned here that when the formation of the next row of knots begins the loop-formers are turned in the reverse directions, as indicated in Fig. 13, whereby one warp-thread $e$ ties the weft-thread $m$ on its right and then the one on its left alternately.

When the threads are in the positions shown in Fig. 9, the hooks $n$ descend and enter the loops on the cylinders on the side farthest from the finished part of the net and to the left of the rod $o$, which has in the meantime been moved forward and entered the recesses 2 and 4 (see Figs. 9 to $9^c$) below the loop. The guides $f$ and the bar $h$, carrying the pushing-off rods $o$, now move so far upward that the loop is pushed off the cylinder $c$ and pin $d$. The hook $n$ also rises, but does not leave the loop. The positions of the different parts of the mechanism at this moment are clearly shown in Fig. 14. As the loops leave the cylinders the tension devices draw the knots tight. (See Fig. 10.) The hooks $n$ then move forward into the position shown in Fig. 11, carrying the knots just formed with them, so that sufficient length of warp and weft will be thus drawn off to produce the required length of mesh. The hooks $n$ remain in this position until the next row of knots is formed, when the hooks are moved upward and forward toward these newly-formed knots. As the hooks rise (see dotted lines in Fig. 12) the knots which they hold are prevented from rising by an adjustable bar $p$.

The hook $n$ is made to enter the loop at the point specified, first, because the bight of the weft-thread $m$ must remain in the center of the knot, and, second, because the portion of the warp-thread $e$ between this bight and the guides $f$ must be kept taut to allow the hooks to pull forward sufficient warp for the mesh.

The pin $d$ projects beyond the cylinder $c$, so that the portion of the warp-thread lying between the hook and the guides $f$ may be drawn taut before the loop is completely struck off.

In machines having two rows of shuttles thread-guides $q$ are provided for the threads $m$ coming from the row of shuttles placed on the side of the loop-formers not having the bar $h$. These thread-guides $q$ temporarily lift these threads $m$ in the same manner that the bar $h$ on the opposite side of the machine raises them, in order that the loop-formers shall not be hindered in their movements. These thread-guides are secured to an angle-bar $q'$, carried by arms $q^2$, which are raised and lowered by any suitable means.

In the modification shown in Fig. 20 the loops are formed in the same way about the cylinder $c$ and pin $d$; but the looper $i^4$ is forked and thrusts the diagonal warp-thread from the position shown in Fig. 6 down to the position shown in Fig. 20. In this case the shuttles $l'$ are not used; but a shuttle $v$ is shot through all of the loops across the net, passing through the openings 2 and 4, which (in the position Fig. 6) are all in line. A complete row of knots is thus produced with one shuttle, the meshes formed being square or oblong.

I claim as my invention—

1. In a netting-machine, the combination of a rotary spindle carrying a pin concentric therewith and a slotted loop-former eccentric to the spindle, with a looper adapted to engage a portion of the warp-thread extending across the slotted end of the loop-former and a shuttle carrying a weft-thread adapted to be passed through the loop so presented by the looper.

2. In a netting-machine, the combination of a rotary slotted loop-former notched at one end and means for raising and lowering the threads on opposite sides of the said former, with a looper adapted to engage a portion of the warp-thread extending across the notched end of the loop-former, and a shuttle carrying a weft-thread to be passed through the loop so presented by said looper, substantially as described.

3. In a netting-machine, the combination of rotary slotted loop-formers notched at one end and means for raising and lowering the threads on opposite sides of the said formers, with loopers adapted to engage portions of the warp-threads extending across the notched end of the loop-formers, and rotary shuttles carrying weft-threads to be passed through the loops so presented by said loopers, substantially as described.

4. In a netting-machine, the combination of a rotary slotted loop-former, notched at one end and means for raising and lowering the threads on opposite sides of the said former, with a looper adapted to engage a portion of the warp-thread extending across the notched end of the loop-former, a shuttle carrying a weft-thread to be passed through the loop so presented by the looper and a hook to enter the formed knot and draw it forward, all substantially as and for the purposes set forth.

5. In a netting-machine, the combination of a rotary slotted loop-former, notched at one end and means for raising and lowering the threads on opposite sides of the said former, with a looper adapted to engage a portion of the warp-thread extending across the notched end of the loop-former, a shuttle carrying a weft-thread to be passed through the loop so presented by the looper and a rod adapted to push off the knot, when formed, from the said loop-former, substantially as and for the purposes set forth.

6. In a netting-machine, the combination of a slotted loop-former notched at one end, reciprocating guides $f$ and reciprocating bar $h$, with a looper adapted to engage a portion of the warp-thread extending across the slotted end of the loop-former and a shuttle carrying a weft-thread to be passed through the loop so presented by the looper.

7. In a netting-machine, a loop-former, consisting of a rotary spindle carrying at one end a pin concentric with the spindle and a cylinder eccentric thereto, a space being left between the said pin and the cylinder, the said cylinder being notched radially at one end, and slotted in line with two opposite notches, substantially as set forth.

In testimony whereof I have signed my name to this specification in the presence of two subscribing witnesses.

MICHAIL WOSCHYLLO.

Witnesses:
   N. TSCHEKALOFF,
   E. WANSCHEIDT.